(12) United States Patent
Zia et al.

(10) Patent No.: US 12,157,812 B2
(45) Date of Patent: Dec. 3, 2024

(54) COLOR STABLE AND LOW WEAR POLYMER COMPOSITION AND ARTICLES MADE THEREFROM

(71) Applicant: Celanese International Corporation, Irving, TX (US)

(72) Inventors: Qamer Zia, Raunheim (DE); Thomas Seelmann, Hattersheim (DE); Kirsten Markgraf, Weinheim (DE)

(73) Assignee: Celanese International Corporation, Irving, TX (US)

( * ) Notice: Subject to any disclaimer, the term of this patent is extended or adjusted under 35 U.S.C. 154(b) by 0 days.

(21) Appl. No.: 18/323,876

(22) Filed: May 25, 2023

(65) Prior Publication Data

US 2023/0323107 A1 Oct. 12, 2023

Related U.S. Application Data

(62) Division of application No. 16/711,925, filed on Dec. 12, 2019, now Pat. No. 11,661,512.

(60) Provisional application No. 62/778,601, filed on Dec. 12, 2018.

(51) Int. Cl.
*C08L 61/02* (2006.01)
*B65G 15/32* (2006.01)

(52) U.S. Cl.
CPC .............. *C08L 61/02* (2013.01); *B65G 15/32* (2013.01); *C08L 2201/08* (2013.01); *C08L 2205/03* (2013.01); *C08L 2205/14* (2013.01)

(58) Field of Classification Search
CPC .. C08L 61/02; C08L 2201/08; C08L 2205/03; C08L 2205/14; C08L 59/02; B65G 15/32; B65G 17/40; B65G 2207/48
See application file for complete search history.

(56) References Cited

U.S. PATENT DOCUMENTS

| | | | |
|---|---|---|---|
| 3,005,795 A | 10/1961 | Froemming Busse et al. | |
| 5,482,987 A | 1/1996 | Forschirm | |
| 5,641,824 A | 6/1997 | Forschirm | |
| 10,030,208 B2 | 7/2018 | Zia et al. | |
| 2014/0187682 A1 | 7/2014 | Mulholland et al. | |
| 2015/0111796 A1* | 4/2015 | Zia | C10M 125/26 508/107 |
| 2015/0184110 A1 | 7/2015 | Hwang et al. | |

(Continued)

OTHER PUBLICATIONS

Ernst Krendlinger et al., "Waxes," Ullman's Encyclopedia of Industrial Chemistry, 63 pages, published online in 2015. (Year: 2015).

(Continued)

*Primary Examiner* — Andrew J. Oyer
(74) *Attorney, Agent, or Firm* — Dority & Manning, P.A.

(57) ABSTRACT

A colorized and tribologically modified polyoxymethylene polymer composition is disclosed. The polyoxymethylene polymer composition is comprised of a polyoxymethylene polymer in combination with at least one tribological modifier. The tribological modifier may include a fluoropolymer. The polymer composition further contains at least one coloring agent in combination with a color stabilizer. The color stabilizer has been found to dramatically improve color consistency. Polymer articles molded from the polymer composition not only have excellent surface appearance but have excellent low friction characteristics when tested against aluminum.

15 Claims, 1 Drawing Sheet

(56) References Cited

U.S. PATENT DOCUMENTS

2016/0096196 A1     4/2016   Papke
2018/0100113 A1     4/2018   Zia et al.

OTHER PUBLICATIONS

Physical Properties for UHMW Sheet, United States Plastic Corp., https://www.usplastic.com/knowledgebase/article.aspx? contentkey= 549, 3-page website printout, accessed on Feb. 28, 2022.
PCT/US19/65860, International Search Report and Written Opinion, dated Apr. 14, 2020.

* cited by examiner

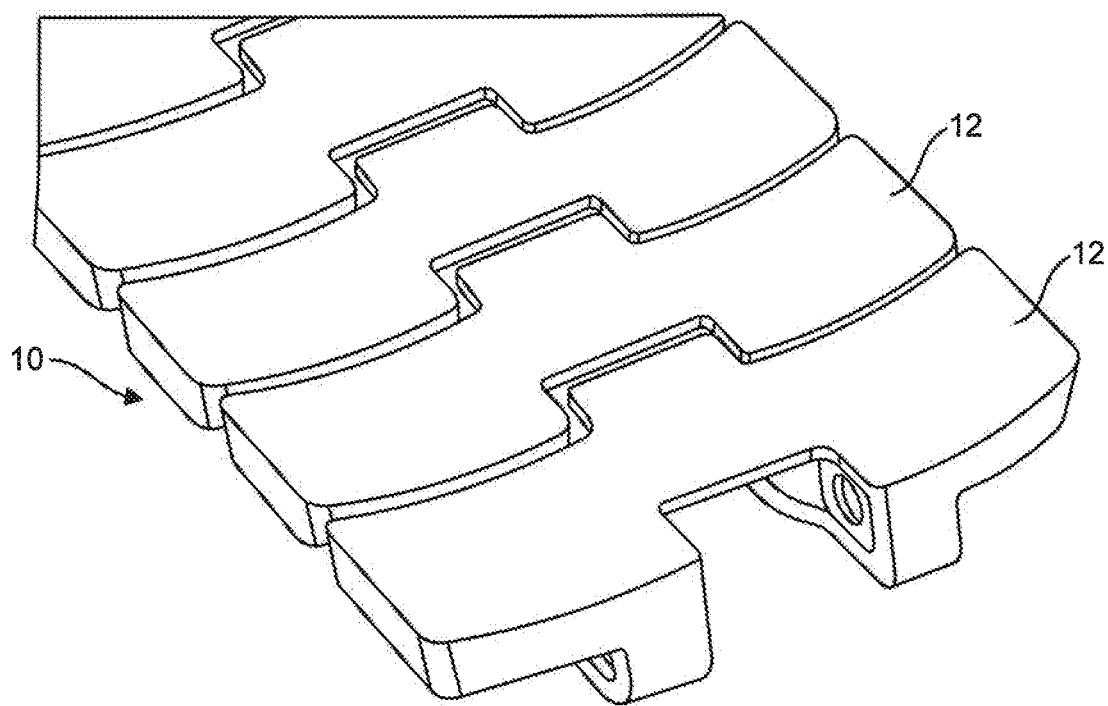

COLOR STABLE AND LOW WEAR POLYMER COMPOSITION AND ARTICLES MADE THEREFROM

RELATED APPLICATIONS

The present application is a divisional application and is based upon and claims priority to U.S. patent application Ser. No. 16/711,925, filed on Dec. 12, 2019, which is based upon and claims priority to U.S. Provisional Patent Application Ser. No. 62/778,601, filed on Dec. 12, 2018, both of which are incorporated herein by reference.

BACKGROUND

Polyacetal polymers, which are commonly referred to as polyoxymethylene polymers, have become established as exceptionally useful engineering materials in a variety of applications. For instance, because polyoxymethylene polymers have excellent mechanical properties, fatigue resistance, abrasion resistance, chemical resistance, and moldability, they are widely used in constructing polymer articles, such as articles for use in the automotive industry and the electrical industry.

The mechanical properties of polyoxymethylene molding compositions are the reason for their use in numerous applications. To improve their properties, polyoxymethylene polymers are often provided with additives to adapt the properties for a specific application, for example by using reinforcing fibers or tribological modifiers. For instance, polyoxymethylene polymers have been combined with a tribological modifier for producing polymer compositions well suited for use in tribological applications where the polymer article is in moving contact with other articles, such as metal articles, plastic articles, and the like. These tribological applications can include embodiments where the polymer composition is formed into gear wheels, pulleys, sliding elements, and the like. The addition of a tribological modifier can provide a composition with a reduced coefficient of friction and low wear.

In the past, high molecular weight polyolefins have been used to improve the wear resistance of polyoxymethylene resins. For instance, U.S. Pat. No. 5,482,987, which is incorporated herein by reference in its entirety, discloses a self-lubricating, low wear composition containing a polyoxymethylene and a lubricating system comprising a high molecular weight polyethylene. U.S. Pat. No. 5,641,824, which is incorporated herein by reference in its entirety, discloses a self-lubricating melt blend of a polyoxymethylene and an ultra-high molecular weight polyethylene.

In addition to high molecular weight polyolefins, numerous other tribological modifiers have been proposed in the past. For instance, other tribological modifiers that have been used in the past include silicones such as silicone oil, polysiloxane, waxes, and the like. Each tribological modifier can display different properties depending upon the particular application. Thus, the use of tribological modifiers in particular applications has been somewhat unpredictable.

In certain applications, in addition to reducing the coefficient of friction and reducing wear, it is desirable that the polymer composition also have aesthetic appeal. For instance, although tribological modifiers can produce compositions having low friction characteristics, the tribological modifiers can have a tendency to create surface imperfections on molded articles made from the compositions and/or may adversely interfere with colorants that may be added to the composition. For example, polymer compositions containing tribological modifiers and a coloring agent typically display inconsistent color variation over the surface of a molded article. In this regard, the present disclosure is directed to polymer compositions that have low friction characteristics, especially when tested against metals such as aluminum, and that are compatible with colorants. More particularly, the present disclosure is directed to a polymer composition containing a tribological modifier in combination with one or more coloring agents that can produce molded articles that show a constant color or color brightness over the surface of the molded articles.

SUMMARY

According to one embodiment, the present disclosure is directed to a polymer composition. The composition is comprised of a polyoxymethylene polymer combined with a tribological modifier system that produces a polymer composition with excellent low friction characteristics, especially when the polymer composition is tested against metals, such as aluminum. In addition to containing one or more tribological modifiers, the polymer composition of the present disclosure also contains a coloring agent in combination with a color stabilizer. For example, the color stabilizer can be compounded with the coloring agent prior to being combined with the other components. In this manner, a polymer composition is produced that not only has low friction characteristics but also can be molded into articles having a stabilized color. More particularly, the color of molded articles made in accordance with the present disclosure has a uniform brightness and/or shade such that the surface of the molded articles displays no color inconsistency.

In one embodiment, for instance, the present disclosure is directed to a polymer composition that includes a polyoxymethylene polymer combined with at least one tribological modifier. The polymer composition further contains at least one coloring agent and a color stabilizer. For example, the color stabilizer can be compounded with the coloring agent. In accordance with the present disclosure, the color stabilizer comprises a non-oxidized polymer wax. For example, the color stabilizer may comprise a polyolefin wax, such as a polyethylene wax or a fatty acid wax, such as ethylene bis-stearamide.

The color stabilizer, in one embodiment, is combined with the coloring agent in amounts so as to dramatically improve the color consistency of molded articles made from the polymer composition. For example, molded articles made from the polymer composition can have a surface brightness that varies by no more than about 0.5, such as less than about 0.3, such as less than about 0.25 ($\Delta L^*$) across a surface of the molded article. Of particular advantage, the above brightness and/or color consistency of molded articles made in accordance with the present disclosure can occur over relatively broad molding conditions. For instance, the above brightness characteristics can be obtained when an article is molded at any temperature between about 185° C. and 215° C.

As described above, the color stabilizer may comprise a polyolefin wax, such as a polyethylene wax. The polyolefin and/or polyethylene wax, for instance, can have a molecular weight of less than about 50,000 g/mol, such as from about 500 g/mol to about 10,000 g/mol. The polyethylene wax can have a density of from about 0.92 g/cm$^3$ to about 0.94 g/cm$^3$. Alternatively, the color stabilizer may comprise a fatty acid wax. The color stabilizer is generally present in the polymer composition in an amount from about 0.5% to about 2% by weight while one or more coloring agents can be present in the polymer composition in an amount from about 0.1% to about 2% by weight.

In one embodiment, the at least one tribological modifier can comprise a fluoropolymer, such as polytetrafluoroethylene. In one embodiment, for instance, the first tribological modifier comprises polytetrafluoroethylene particles. The particles can have a mean particle diameter of from about 1 micron to about 10 microns, such as from about 3 microns to about 10 microns, when tested according to ISO Test 13321. The first tribological modifier can be present in the polymer composition in an amount greater than about 0.5% by weight, such as in an amount greater than about 1% by weight, such as in an amount greater than about 1.5% by weight. The first tribological modifier is generally present in an amount less than about 5% by weight, such as in an amount less than about 3% by weight, such as in an amount less than about 2.5% by weight.

In one embodiment, the polymer composition may contain a second tribological modifier. The second tribological modifier can comprise a polyolefin polymer. The polyolefin polymer can comprise a high density polyethylene. The high density polyethylene, for instance, may comprise an oxidized high density polyethylene homopolymer. The high density polyethylene can have a Shore D hardness of from about 69 to about 80. The high density polyethylene can have a density of greater than about 0.94 $g/cm^3$, such as greater than about 0.95 $g/cm^3$, such as greater than about 0.96 $g/cm^3$, such as greater than about 0.97 $g/cm^3$. The density is generally less than about 1 $g/cm^3$, such as less than about 0.99 $g/cm^3$.

The polymer composition can display a dynamic coefficient of friction of less than about 0.2, such as less than about 0.18, such as less than about 0.16, such as less than about 0.14, such as less than about 0.12, such as less than about 0.1, such as less than about 0.08 when tested against aluminum. In one embodiment, the dynamic coefficient of friction is substantially 0. In addition, the polymer composition can exhibit a wear track depth when tested against aluminum of less than about 2 microns, such as less than about 1.5 microns, such as less than about 1 micron, such as less than about 0.5 microns, such as less than about 0.3 microns, such as less than about 0.1 microns. The dynamic coefficient of friction can be tested according to VDA Test 230-206. During the VDA 230-206 Test, a ball-on-plate configuration is used. A steel ball is used having an $R_z$ of 1 to 5 microns. The force was 30 N and the velocity was 150 mm/s. The movement was oscillating. The output of the VDA 230-206 Test is static coefficient of friction, dynamic coefficient of friction, and abrasion width of the system. In addition, the wear track depth can be measured using any suitable depth sensing device that is accurate to hundredths of a micron.

The polymer composition of the present disclosure is particularly well suited for producing sliding members that are intended to contact metallic components or products. For example, the polymer composition of the present disclosure is well suited to producing conveyor parts that are intended to convey aluminum containers, such as beverage cans. As described above, the polymer composition of the present disclosure has excellent low friction characteristics when tested against aluminum.

In one embodiment, the present disclosure is directed to a conveyor device that comprises a conveyor chain that moves over a track. The conveyor chain can include a plurality of conveyor components having a top surface for receiving and transporting products, such as beverage cans. The conveyor components can be made from the polymer composition as described above.

Other features and aspects of the present disclosure are discussed in greater detail below.

BRIEF DESCRIPTION OF THE DRAWINGS

A full and enabling disclosure of the present disclosure is set forth more particularly in the remainder of the specification, including reference to the accompanying figures, in which:

FIG. 1 is a perspective view of one embodiment of a conveyor chain made in accordance with the present disclosure.

Repeat use of reference characters in the present specification and drawings is intended to represent the same or analogous features or elements of the present invention.

DETAILED DESCRIPTION

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations.

In general, the present disclosure is directed to a polyoxymethylene polymer composition and to polymer articles made from the composition. The polymer composition contains a polyoxymethylene polymer and has improved tribological properties such as excellent low friction characteristics, especially when tested against a metal such as aluminum. In addition, the polymer composition can be formulated so as to have dramatically enhanced surface appearance when molded into polymer articles. More particularly, polymer articles molded from the polymer composition of the present disclosure display an enhanced appearance due to possessing uniform color characteristics.

In the past, various tribological modifiers have been used in order to improve wear characteristics and reduce the coefficient of friction of polymer articles containing the tribological modifier. Unfortunately, however, polyoxymethylene polymer compositions containing tribological modifiers have a tendency to show inconsistent color when combined with one or more color pigments and molded into articles. The molded articles, for instance, may show color variation across the surface of the article and from one article to the next. For instance, these color variations can be visible to the eye especially when two or more articles molded from the polymer composition are placed next to one another in use. In accordance with the present disclosure, however, it has been discovered that the use of a color stabilizer can dramatically reduce color variation, even when different molded articles are made from the same composition at different molding temperatures.

For instance, molded articles in accordance with the present disclosure display a constant color across the entire surface of the article, especially when comparing the color of the molded article close to areas where the molten polymer composition flows through a gate into the mold and at regions positioned distant from the gate. In addition to displaying constant color over the surface of the same molded article, the polymer composition of the present disclosure also displays constant color from molded article to molded article.

In one particular embodiment, the polymer composition comprises a polyoxymethylene polymer combined with at least one tribological modifier. The at least one tribological modifier may comprise a fluoropolymer. In accordance with the present disclosure, the polymer composition further contains at least one coloring agent in combination with a color stabilizer. In one embodiment, the coloring agent and the color stabilizer can be compounded together and added to the polymer composition. The color stabilizer generally comprises a non-oxidized wax, such as a polyolefin wax or a fatty acid wax, such as a polyolefin-modified fatty acid. The color stabilizer counteracts the effects of the tribological modifier permitting the coloring agent to disperse uniformly throughout the polymer composition and form polymer articles having surfaces that display a constant color with uniform brightness and/or shade.

In general, any suitable polyoxymethylene polymer may be incorporated into the polymer composition.

The preparation of the polyoxymethylene polymer can be carried out by polymerization of polyoxymethylene-forming monomers, such as trioxane or a mixture of trioxane and a cyclic acetal such as dioxolane in the presence of a molecular weight regulator, such as a glycol. The polyoxymethylene polymer used in the polymer composition may comprise a homopolymer or a copolymer. According to one embodiment, the polyoxymethylene is a homo- or copolymer which comprises at least 50 mol. %, such as at least 75 mol. %, such as at least 90 mol. % and such as even at least 97 mol. % of —CH$_2$O-repeat units.

In one embodiment, a polyoxymethylene copolymer is used. The copolymer can contain from about 0.1 mol. % to about 20 mol. % and in particular from about 0.5 mol. % to about 10 mol. % of repeat units that comprise a saturated or ethylenically unsaturated alkylene group having at least 2 carbon atoms, or a cycloalkylene group, which has sulfur atoms or oxygen atoms in the chain and may include one or more substituents selected from the group consisting of alkyl cycloalkyl, aryl, aralkyl, heteroaryl, halogen or alkoxy. In one embodiment, a cyclic ether or acetal is used that can be introduced into the copolymer via a ring-opening reaction.

Preferred cyclic ethers or acetals are those of the formula:

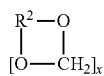

in which x is 0 or 1 and R$^2$ is a C$_2$-C$_4$-alkylene group which, if appropriate, has one or more substituents which are C$_1$-C$_4$-akyl groups, or are C$_1$-C$_4$-alkoxy groups, and/or are halogen atoms, preferably chlorine atoms. Merely by way of example, mention may be made of ethylene oxide, propylene 1,2-oxide, butylene 1,2-oxide, butylene 1,3-oxide, 1,3-dioxane, 1,3-dioxolane, and 1,3-dioxepan as cyclic ethers, and also of linear oligo- or polyformals, such as polydioxolane or polydioxepan, as comonomers. It is particularly advantageous to use copolymers composed of from 99.5 to 95 mol. % of trioxane and of from 0.5 to 5 mol. %, such as from 0.5 to 4 mol. %, of one of the above-mentioned comonomers.

The polymerization can be effected as precipitation polymerization or in the melt. By a suitable choice of the polymerization parameters, such as duration of polymerization or amount of molecular weight regulator, the molecular weight and hence the MVR value of the resulting polymer can be adjusted.

In one embodiment, the polyoxymethylene polymer used in the polymer composition may contain a relatively high amount of reactive groups or functional groups in the terminal positions. The reactive groups, for instance, may comprise —OH or —NH$_2$ groups.

In one embodiment, the polyoxymethylene polymer can have terminal hydroxyl groups, for example hydroxyethylene groups and/or hydroxyl side groups, in at least more than about 50% of all the terminal sites on the polymer. For instance, the polyoxymethylene polymer may have at least about 70%, such as at least about 80%, such as at least about 85% of its terminal groups be hydroxyl groups, based on the total number of terminal groups present. It should be understood that the total number of terminal groups present includes all side terminal groups.

In one embodiment, the polyoxymethylene polymer has a content of terminal hydroxyl groups of at least 15 mmol/kg, such as at least 18 mmol/kg, such as at least 20 mmol/kg. In one embodiment, the terminal hydroxyl group content ranges from 18 to 50 mmol/kg. In an alternative embodiment, the polyoxymethylene polymer may contain terminal hydroxyl groups in an amount less than 20 mmol/kg, such as less than 18 mmol/kg, such as less than 15 mmol/kg. For instance, the polyoxymethylene polymer may contain terminal hydroxyl groups in an amount from about 5 mmol/kg to about 20 mmol/kg, such as from about 5 mmol/kg to about 15 mmol/kg. For example, a polyoxymethylene polymer may be used that has a lower terminal hydroxyl group content but has a higher melt volume flow rate.

In addition to or instead of the terminal hydroxyl groups, the polyoxymethylene polymer may also have other terminal groups usual for these polymers. Examples of these are alkoxy groups, formate groups, acetate groups or aldehyde groups. According to one embodiment, the polyoxymethylene is a homo- or copolymer which comprises at least 50 mol-%, such as at least 75 mol-%, such as at least 90 mol-% and such as even at least 95 mol-% of —CH$_2$O-repeat units.

In one embodiment, a polyoxymethylene polymer can be produced using a cationic polymerization process followed by solution hydrolysis to remove any unstable end groups. During cationic polymerization, a glycol, such as ethylene glycol or methylal can be used as a chain terminating agent. A heteropoly acid, triflic acid or a boron compound may be used as the catalyst.

The polyoxymethylene polymer can have any suitable molecular weight. The molecular weight of the polymer, for instance, can be from about 4,000 grams per mole to about 20,000 g/mol. In other embodiments, however, the molecular weight can be well above 20,000 g/mol, such as from about 20,000 g/mol to about 100,000 g/mol.

The polyoxymethylene polymer present in the composition can generally melt flow index (MFI) ranging from about 1 to about 50 g/10 min, as determined according to ISO 1133 at 190° C. and 2.16 kg, though polyoxymethylenes having a higher or lower melt flow index are also encompassed herein. For example, the polyoxymethylene polymer may be a low or mid-molecular weight polyoxymethylene that has a melt flow index of greater than about 5 g/10 min, greater than about 10 g/10 min, or greater than about 15 g/10 min. The melt flow index of the polyoxymethylene polymer can be less than about 25 g/10 min, less than about 20 g/10 min, less than about 18 g/10 min, less than about 15 g/10 min, less than about 13 g/10 min, or less than about 12 g/10 min. The polyoxymethylene polymer may for instance be a high molecular weight polyoxymethylene that has a melt flow index of less than about 5 g/10 min, less than about 3 g/10 min, or less than about 2 g/10 min.

Suitable commercially available polyoxymethylene polymers are available under the trade name Hostaform® (HF) by Celanese/Ticona.

The polyoxymethylene polymer may be present in the polyoxymethylene polymer composition in an amount of at least 50 wt. %, such as at least 60 wt. %, such as at least 70 wt. %, such as at least 80 wt. %, such as at least 85 wt. %, such as at least 90 wt. %, such as at least 93 wt. %. In general, the polyoxymethylene polymer is present in an amount of less than about 100 wt. %, such as less than about 99 wt. %, such as less than about 97 wt. %, wherein the weight is based on the total weight of the polyoxymethylene polymer composition.

According to the present disclosure, the polyoxymethylene polymer is combined with at least one tribological modifier. One tribological modifier that may be used comprises a fluoropolymer, such as a polytetrafluoroethylene powder. The polytetrafluoroethylene particles, for instance, can have an average particle size of less than about 15 microns, such as less than about 12 microns, such as less than about 10 microns, such as less than about 8 microns. The average particle size of the polytetrafluoroethylene particles is generally greater than about 0.5 microns, such as greater than about 1 micron, such as greater than about 2 microns, such as greater than about 3 microns, such as greater than about 4 microns, such as greater than about 5 microns. Average particle size can be measured according to ISO Test 13321.

In one embodiment, the polytetrafluoroethylene particles can have a relatively low molecular weight. The polytetrafluoroethylene polymer may have a density of from about 300 g/l to about 450 g/l, such as from about 325 g/l to about 375 g/l when tested according to ASTM Test D4895. The polytetrafluoroethylene particles can have a specific surface area of from about 5 m$^2$/g to about 15 m$^2$/g, such as from about 8 m$^2$/g to about 12 m$^2$/g when tested according to Test DIN66132. The melt flow rate of the polytetrafluoroethylene polymer can be less than about 3 g/10 min, such as less than about 2 g/10 min when tested according to ISO Test 1133 when carried out at 372° C. with a load of 10 kg.

The polytetrafluoroethylene particles can be present in the polymer composition in an amount greater than about 0.5% by weight, such as in an amount greater than about 1% by weight, such as in an amount greater than about 1.5% by weight, such as in an amount greater than about 2% by weight. The polytetrafluoroethylene polymer is generally present in the polymer composition in an amount less than about 10% by weight, such as in an amount less than about 7% by weight, such as in an amount less than about 5% by weight, such as in an amount less than about 4% by weight, such as in an amount less than about 3% by weight.

In addition to a fluoropolymer, the polymer composition may optionally contain a second tribological modifier. The second tribological modifier may comprise a polyolefin, such as a high density polyolefin. For example, the polymer composition may contain a high density polyethylene polymer. In one embodiment, the high density polyethylene may comprise an oxidized high density polyethylene. The high density polyethylene polymer, for instance, may have a density or specific gravity of greater than about 0.94 g/cm$^3$, such as greater than about 0.95 g/cm$^3$, such as greater than about 0.96 g/cm$^3$, such as greater than about 0.97 g/cm$^3$. The density is generally less than about 1 g/cm$^3$. The high density polyethylene can have a viscosity when tested at 150° C. of greater than about 1,000 cps, such as greater than about 2,000 cps, such as greater than about 4,000 cps, such as greater than about 6,000 cps, such as greater than about 8,000 cps. The viscosity is generally less than about 15,000 cps, such as less than about 10,000 cps. Viscosity is measured using a Brookfield rotational viscometer of Brookfield Engineering Laboratories, Middleboro, Massachusetts. The high density polyethylene can have a Shore D hardness of greater than about 67, such as greater than about 68, such as greater than about 69. The Shore D hardness is generally less than about 80, such as less than about 75, such as less than about 73. Shore D hardness can be measured according to ASTM Test D785. The molecular weight of the polyethylene polymer is generally less than about 2 million, such as less than about 1 million.

The polyolefin tribological modifier can be present in the polymer composition in an amount greater than about 0.1% by weight, such as in an amount greater than about 0.5% by weight, such as in an amount greater than about 0.7% by weight. The polyolefin polymer is generally present in the composition in an amount less than about 5% by weight, such as in an amount less than about 4% by weight, such as in an amount less than about 3% by weight, such as in an amount less than about 2% by weight, such as in an amount less than about 1.5% by weight.

In addition to a polyoxymethylene polymer and one or more tribological modifiers, the polymer composition of the present disclosure contains at least one coloring agent in combination with a color stabilizer. In general, any suitable coloring agent can be present in the polymer composition. Coloring agents that may be used include inorganic pigments, organic pigments and dyes, carbon black, and various other polymer-soluble dyes. Particular coloring agents that may be used include titanium dioxide, ultramarine blue, cobalt blue, phthalocyanines, anthraquinnones, and the like.

In one embodiment, the polymer composition may contain one or more of a fluorescent brightener 184, a pigment orange 68, a pigment red 247, a pigment green 7, a pigment blue 15, a quinacridone red, a pigment violet 23, a pigment brown 24, and a pigment red 122. In one embodiment, a combination of coloring agents may be included in the polymer composition.

In some cases, the polymer composition may contain iron oxide and iron hydroxide pigments (e.g., Bayferrox 110M, 120M, 3910, Colortherm Red 130M/160M/180M; e.g., those having particle sizes between 0.1 µm and 1 µm in increments of 0.1 µm therebetween), pigment red 101, pigment red 254, pigment yellow 180, chinophthalone pigments, nitrogenic pigments (e.g., Ni/Sb/Ti Oxide pigments), and sulfuric pigments (e.g., sodium alumino sulphosilicate).

Heliogen Blue K 7090 is representative of a pigment blue 15 or unchlorinated copper phthalocyanine (beta form with approx . . . 11 wt. % copper). Unavoidable impurities are suppressed to less than 20 ppm antimony, less than 20 ppm arsenic, less than 20 ppm lead, less than 30 ppm cadmium, less than 50 ppm chromium, less than 20 ppm selenium, less than 20 ppm mercury, and less than 20 ppm zinc. Any primary aromatic amines are also suppressed to less than 100 ppm.

Sicotan Yellow K 2112 is representative of a rutile pigment based on chromium III oxide, antimony pentoxide, and titanium dioxide. Any acid-soluble antimony is present in an amount less than about 20 ppm. Additionally, unavoidable impurities are suppressed to 30 ppm arsenic, 50 ppm lead, less than 10 ppm cadmium, less than 10 ppm cobalt, less than 10 ppm copper, less than 50 ppm nickel, less than 1 ppm selenium, less than 1 ppm mercury, and less than 100 ppm zinc. Another example is Titanorange 6994.

Printex FP is representative of a carbon black or pigment black 7.

Kronos 2220 and 2233 are representative of rutile pigments produced by a chloride process, representative of $R^2$ compounds corresponding to DIN EN ISO 591 part 1, containing, respectively, a minimum 95.5, 92.5, and 96 wt. % $TiO_2$ and are stabilized, respectively, with compounds containing aluminum, aluminum with silicon, and aluminum with silicon. The scattering power of a plastisol formulation containing the same may be, respectively, approximately 99 and 104. Various grades of titanium dioxide may be employed depending on the target design needs. For example, Kronos 2233 is a titanium dioxide which resists degradation of the carrier polymer and maintains tinting effects even at high processing temperatures.

PV Fast Green GNX is representative of a pigment green 7 (copper phthalocyanine).

PV Fast Red E5B is representative of a pigment violent 19 or a quinacridone red.

Heliogen Green K 8730 is representative of pigment green 7 or a chlorinated copper phthalocyanine (with approx. 5.6 wt. % copper). Unavoidable impurities are suppressed to less than 20 ppm antimony, less than 20 ppm arsenic, less than 20 ppm lead, less than 30 ppm cadmium, less than 50 ppm chromium, less than 20 ppm selenium, less than 20 ppm mercury, and less than 20 ppm zinc. Any primary aromatic amines are also suppressed to less than 100 ppm.

The coloring agent may be present in the composition in an amount of at least about 0.01 wt. %, such as at least about 0.05 wt. %, such as at least about 0.1 wt. %, such as at least about 0.5 wt. %, such as at least about 0.8 wt. %, such as at least about 1 wt. % and less than about 5 wt. %, such as less than about 2.5 wt. %, such as less than about 1 wt. %, wherein the weight is based on the total weight of the respective polymer composition.

In accordance with the present disclosure, one or more coloring agents are present in the polymer composition in conjunction with a color stabilizer. The color stabilizer, for instance, may comprise a low molecular weight polymer. For example, in one embodiment, the color stabilizer may comprise a low molecular weight polyolefin, such as a low molecular weight polyethylene.

The molecular weight of the polyethylene, for instance, can generally be less than about 10,000 g/mol, such as less than about 8,000 g/mol, such as less than about 6,000 g/mol, such as less than about 4,000 g/mol and generally greater than about 500 g/mol, such as greater than about 1,000 g/mol. The polyethylene wax can have a density of from about 0.88 g/cm$^3$ to about 0.99 g/cm$^3$, such as from about 0.92 g/cm$^3$ to about 0.98 g/cm$^3$. Density can be measured according to ISO Test 1183.

The polyolefin polymer can comprise a homopolymer or a copolymer. For instance, in one embodiment, the color stabilizer may comprise a polyethylene copolymer, such as a copolymer of polyethylene and a C3 to C10 alkylene. For instance, the copolymer may comprise an ethylene propylene copolymer, an ethylene butylene copolymer, or an ethylene octene copolymer.

The polyolefin polymer can be made using any suitable catalyst. In one embodiment, for instance, the polyolefin polymer, such as the polyethylene polymer, can comprise a metallocene catalyzed polymer. Using a metallocene catalyzed polymer, for instance, may provide various advantages and provide a polymer with an optimized molecular weight distribution.

In an alternative embodiment, the color stabilizer may comprise a polyolefin modified low molecular weight polymer. For example, the color stabilizer may comprise a polyethylene modified fatty acid. In one embodiment, for instance, the color stabilizer may comprise an ethylene and fatty acid polymer, such as ethylene bis-stearamide.

In general, the polymer used as the color stabilizer is a non-oxidized polymer. Oxidized polyethylene waxes, for instance, have been used in the past in various polymer compositions in conjunction with coloring agents. Oxidized polymers, however, have been found to not improve color stability and, in some embodiments, may actually adversely affect the color stability of the polymer composition.

The color stabilizer can be precompounded with one or more coloring agents. Alternatively, the color stabilizer can be added with the coloring agent to the polymer composition. In one embodiment, the color stabilizer can have a fine grain structure and can have a particle size of generally less than about 2,000 microns and generally greater than about 500 microns. The color stabilizer can be included in the polymer composition in an amount generally greater than about 0.0001% by weight, such as greater than about 0.001% by weight, such as greater than about 0.5% by weight and generally less than about 10% by weight, such as less than about 5% by weight, such as less than about 4% by weight, such as less than about 3% by weight, such as less than about 2% by weight, such as less than about 1% by weight. The color stabilizer can be present in conjunction with one or more coloring agents at a weight ratio of from about 50:1 to about 1:10, such as from about 10:1 to about 1:5, such as from about 5:1 to about 1:1.

The polymer composition of the present disclosure may also contain other known additives such as, for example, antioxidants, formaldehyde scavengers, acid scavengers, UV stabilizers or heat stabilizers, reinforcing fibers. In addition, the compositions can contain processing auxiliaries, for example adhesion promoters, lubricants, nucleants, demolding agents, fillers, or antistatic agents and additives which impart a desired property to the compositions and articles or parts produced therefrom.

In one embodiment, an ultraviolet light stabilizer may be present. The ultraviolet light stabilizer may comprise a benzophenone, a benzotriazole, or a benzoate. The UV light absorber, when present, may be present in the polymer composition in an amount of at least about 0.01 wt. %, such as at least about 0.05 wt. %, such as at least about 0.075 wt. % and less than about 1 wt. %, such as less than about 0.75 wt. %, such as less than about 0.5 wt. %, wherein the weight is based on the total weight of the respective polymer composition.

In one embodiment, a formaldehyde scavenger, such as a nitrogen-containing compound, may be present. Mainly, of these are heterocyclic compounds having at least one nitrogen atom as hetero atom which is either adjacent to an amino-substituted carbon atom or to a carbonyl group, for example pyridine, pyrimidine, pyrazine, pyrrolidone, aminopyridine and compounds derived therefrom. Other particularly advantageous compounds are triamino-1,3,5-triazine (melamine) and its derivatives, such as melamine-formaldehyde condensates and methylol melamine. Oligomeric polyamides are also suitable in principle for use as formaldehyde scavengers. The formaldehyde scavenger may be used individually or in combination.

In one embodiment, the polymer composition may contain a copolyamide that may also serve as a formaldehyde scavenger. The copolyamide can have a softening point of generally greater than about 120° C., such as greater than about 130° C., such as greater than about 140° C., such as greater than about 150° C., such as greater than about 160° C., such as greater than about 170° C. The softening point of the copolyamide may be less than about 210° C., such as less than about 200° C., such as less than about 190° C., such as less than about 185° C. The copolyamide may have a melt viscosity at 230° C. of greater than about 7 Pa s, such as greater than about 8 Pa s, such as greater than about 9 Pas. The melt viscosity is generally less than about 15 Pas, such as less than about 14 Pa s, such as less than about 13 Pas. In one embodiment, the copolyamide is ethanol soluble. In one embodiment, the copolyamide may comprise a polycondensation product of polymeric fatty acids with aliphatic diamines.

Further, the formaldehyde scavenger may be a guanamine compound which may include an aliphatic guanamine-based compound, an alicyclic guanamine-based compound, an aromatic guanamine-based compound, a hetero atom-containing guanamine-based compound, or the like. The formaldehyde scavenger may be present in the polymer composition in an amount of at least about 0.01 wt. %, such as at least about 0.05 wt. %, such as at least about 0.075 wt. % and less than about 1 wt. %, such as less than about 0.75 wt. %, such as less than about 0.5 wt. %, wherein the weight is based on the total weight of the respective polymer composition.

In one embodiment, an acid scavenger may be present. The acid scavenger may comprise, for instance, an alkaline earth metal salt. For instance, the acid scavenger may comprise a calcium salt, such as a calcium citrate. In one embodiment, the acid scavenger may comprise tricalcium citrate. The acid scavenger may be present in an amount of at least about 0.001 wt. %, such as at least about 0.005 wt. %, such as at least about 0.0075 wt. % and less than about 1 wt. %, such as less than about 0.75 wt. %, such as less than about 0.5 wt. %, wherein the weight is based on the total weight of the respective polymer composition.

In one embodiment, a nucleant may be present. The nucleant may increase crystallinity and may comprise an oxymethylene terpolymer. In one particular embodiment, for instance, the nucleant may comprise a terpolymer of butanediol diglycidyl ether, ethylene oxide, and trioxane. The nucleant may be present in the composition in an amount of at least about 0.01 wt. %, such as at least about 0.05 wt. %, such as at least about 0.1 wt. % and less than about 2 wt. %, such as less than about 1.5 wt. %, such as less than about 1 wt. %, wherein the weight is based on the total weight of the respective polymer composition.

In one embodiment, an antioxidant, such as a sterically hindered phenol, may be present. Examples which are available commercially, are pentaerythrityl tetrakis [3-(3,5-di-tert-butyl-4-hydroxyphenyl) propionate], triethylene glycol bis [3-(3-tert-butyl-4-hydroxy-5-methylphenyl) propionate], 3,3'-bis [3-(3,5-di-tert-butyl-4-hydroxyphenyl) propionohydrazide], and hexamethylene glycol bis [3-(3,5-di-tert-butyl-4-hydroxyphenyl) propionate]. The antioxidant may be present in the polymer composition in an amount of at least about 0.01 wt. %, such as at least about 0.05 wt. %, such as at least about 0.075 wt. % and less than about 1 wt. %, such as less than about 0.75 wt. %, such as less than about 0.5 wt. %, wherein the weight is based on the total weight of the respective polymer composition.

In one embodiment, lights stabilizers, such as sterically hindered amines, may be present in addition to the ultraviolet light stabilizer. Hindered amine light stabilizers that may be used include oligomeric hindered amine compounds that are N-methylated. For instance, hindered amine light stabilizer may comprise a high molecular weight hindered amine stabilizer. The light stabilizers, when present, may be present in the polymer composition in an amount of at least about 0.01 wt. %, such as at least about 0.05 wt. %, such as at least about 0.075 wt. % and less than about 1 wt. %, such as less than about 0.75 wt. %, such as less than about 0.5 wt. %, wherein the weight is based on the total weight of the respective polymer composition.

The compositions of the present disclosure can be compounded and formed into a polymer article using any technique known in the art. For instance, the respective composition can be intensively mixed to form a substantially homogeneous blend. The blend can be melt kneaded at an elevated temperature, such as a temperature that is higher than the melting point of the polymer utilized in the polymer composition but lower than the degradation temperature. Alternatively, the respective composition can be melted and mixed together in a conventional single or twin screw extruder. Preferably, the melt mixing is carried out at a temperature ranging from 100 to 280° C., such as from 120 to 260° C., such as from 140 to 240° C. or 180 to 220° C.

After extrusion, the compositions may be formed into pellets. The pellets can be molded into polymer articles by techniques known in the art such as injection molding, thermoforming, blow molding, rotational molding and the like. According to the present disclosure, the polymer articles demonstrate excellent tribological behavior and mechanical properties.

In addition, polymer articles made according to the present disclosure can display uniform and consistent color values over the surface of each article and/or from article to article. The improved color characteristics can also occur over a wide range of molding conditions. For instance, color consistency has been demonstrated over a broad temperature range, such as from about 195° C. to about 215° C. during molding.

Color consistency, for instance, can be shown by measuring brightness values over the surface of a molded article or by comparing the surfaces of more than one molded article. For example, in order to characterize the color of the composition, the color can be expressed objectively using the CIELab color scale and specifying values for L*, a*, and b*. CIE L*a*b* (CIELAB) is a color space specified by the International Commission on Illumination (French Commission internationale de l'éclairage, hence its CIE initialism). It describes all the colors visible to the human eye and was created to serve as a device-independent model to be used as a reference.

The three coordinates of CIELab represent the lightness of the color (L*=0 yields black and L*=100 indicates diffuse white; specular white may be higher), its position between red/magenta and green (a*, negative values indicate green while positive values indicate magenta) and its position between yellow and blue (b*, negative values indicate blue and positive values indicate yellow).

Thus, the CIELab color scale may be used to characterize and quantitatively describe perceived colors with a relatively high level of precision. More specifically, CIELab may be used to illustrate a gamut of color because L*a*b* color space has a relatively high degree of perceptual uniformity between colors. As a result, L*a*b* color space may be used to describe the gamut of colors that an ordinary observer may actually perceive visually.

CIELab allows a color to be plotted in a three-dimensional space analogous to the Cartesian xyz space. Any color may be plotted in CIELab according to the three values (L*, a*, b*). For example, there is an origin with two axis a* and b* that are coplanar and perpendicular, as well as an L-axis which is perpendicular to the a* and b* axes, and intersects those axes only at the origin. A negative a* value represents green and a positive a* value represents red. CIELab has the colors blue-violet to yellow on what is traditionally the y-axis in Cartesian xyz space. CIELab identifies this axis as the b*-axis. Negative b* values represent blue-violet and positive b* values represent yellow. CIELab has lightness on what is traditionally the z-axis in Cartesian xyz space. CIELab identifies this axis as the L-axis. The L*-axis ranges in value from 100, which is white, to 0, which is black. An L* value of 50 represents a mid-tone gray (provided that a* and b* are 0). Any color may be plotted in CIELab according to the three values (L*, a*, b*). As described supra, equal distances in CIELab space correspond to approximately uniform changes in perceived color. As a result, one of skill in the art is able to approximate perceptual differences between any two colors by treating each color as a different point in a three dimensional, Euclidian, coordinate system, and calculating the Euclidian distance between the two points ($\Delta E^*_{ab}$).

In accordance with the present disclosure, the color consistency of a molded article or of a plurality of molded articles can be determined by measuring the difference in L* values on multiple places on the surface of an article or by comparing L* values on different molded articles ($\Delta L^*$). As used herein, the L* value is measured using a sphere geometry, specular included.

In one embodiment, the $\Delta L^*$ values are measured for polymer compositions made in accordance with the present disclosure that have a gray color, such as molded articles having a L* value of between about 50 and about 80. The measurements can be made on standard tensile bars or plaques in accordance with ISO Test 527-1.

In accordance with the present disclosure, molded articles as described above can display a surface brightness difference between two locations on the surface of the molded article of no more than about 0.5, such as less than about 0.3, such as less than about 0.25 ($\Delta L^*$). The above results can be obtained over a very broad temperature range, such as at a temperature range of from 185° C. to 215° C. The above results can be obtained at any temperature within the above range.

Various different polymer articles can be molded in accordance with the present disclosure.

In one embodiment, the polymer articles include any moving articles or moldings that are in contact with another surface and may require high tribological requirements. For instance, polymer articles include articles for the automotive industry, especially housings, latches such as rotary latches, window winding systems, wiper systems, pulleys, sun roof systems, seat adjustments, levers, bushes, gears, gear boxes, claws, pivot housings, wiper arms, brackets or seat rail bearings, zippers, switches, cams, rollers or rolling guides, sliding elements or glides such as sliding plates, conveyor belt parts such as chain elements and links, castors, fasteners, levers, conveyor system wear strips and guard rails, medical equipment such as medical inhalers and injectors. An almost limitless variety of polymer articles may be formed from the polymer compositions of the present disclosure.

In one embodiment, polymer articles made in accordance with the present disclosure can be used to make components of a conveyor system. Conveyor systems, for instance, typically include a conveyor chain that moves over a track. Such conveyor systems can be used to move all different types of products and goods. In one embodiment, for instance, such conveyors are used to transport metal products, such as beverage cans made from aluminum. In placing the beverage cans on the conveyor system, the cans typically have to move across the surface of the conveyor when being loaded onto the conveyor and when being unloaded from the conveyor into packages. In the past, problems have been experienced in providing a conveyor chain surface that not only has low friction characteristics with respect to aluminum, but that also is wear resistant. Also important is the ability to produce a conveyor chain that has a surface appearance that does not degrade over time. The composition of the present disclosure is particularly well suited to molding articles that can be used as conveyor chain components. In particular, the components made according to the present disclosure can have a surface over which the metal products may slide.

Referring to FIG. 1, for instance, one embodiment of a portion of a conveyor chain 10 is illustrated. As shown, the conveyor chain 10 is made from a plurality of conveyor components 12 or links. Each of the conveyor components 12 includes a top surface for receiving and transporting products. In accordance with the present disclosure, the conveyor component 12 can be made from the polymer composition of the present disclosure. Of particular advantage, the conveyor component 12 can include one or more coloring agents that provide the components with a desired surface appearance.

Utilizing the polyoxymethylene polymer composition and polymer article produced therefrom according to the present disclosure provides compositions and articles with improved tribological properties. According to the present disclosure, the tribological properties are generally measured by the coefficient of friction.

In general, static friction is the friction between two or more surfaces that are not moving relative to each other (ie., both objects are stationary). In general, dynamic friction occurs when two objects are moving relative to each other (ie., at least one object is in motion or repeated back and forth motion). In addition, stick-slip is generally known as a phenomenon caused by continuous alternating between static and dynamic friction.

According to the present disclosure, the composition and polymer article may exhibit a dynamic coefficient of friction against aluminum, as determined according to VDA 230-206, of generally less than about 0.3, such as less than about 0.25, such as less than about 0.2, such as less than about 0.1. The dynamic coefficient of friction is generally greater than 0. The above dynamic coefficient of friction is measured with a force of 30 N, a velocity of 150 mm/s, and after 5,000 cycles using a plate made from the composition and a counterpart ball of aluminum.

Polymer compositions according to the present disclosure when tested against aluminum may exhibit a depth of wear of less than about 2 microns, such as less than about 1 micron, such as less than about 0.5 microns. The depth of wear can be even 0.

While the polyoxymethylene polymer composition and polymer articles produced therefrom of the present invention provide improved tribological properties, the compositions and articles may also exhibit excellent mechanical properties (ISO Test 527). For example, when tested according to ISO Test No. 527, the polymer composition may have a tensile modulus of greater than about 5,000 MPa, such as greater than about 5,500 MPa, such as greater than about 5,700 MPa. The tensile modulus is generally less than about 10,000 MPa. In one embodiment, the strength at break can be greater than about 100 MPa, such as greater than about 110 MPa.

The polymer composition can exhibit a notched Charpy impact strength at 23° C. (ISO Test 179-1) of greater than about 8 KJ/m², such as greater than about 9 KJ/m², such as greater than about 9.5 KJ/m². The notched Charpy impact strength is generally less than about 20 KJ/m².

The polymer composition can exhibit a melt volume flow rate of from about 0.5 cm³/10 min to about 5 cm³/10 min in certain embodiments. In one embodiment, the melt volume flow rate is from about 1.5 cm³/10 min to about 2 cm³/10 min. The melt volume flow rate can be measured at 190° C. and at a load of 2.16 kilograms.

The present disclosure may be better understood with reference to the following examples.

EXAMPLE

In this example, various polymer compositions were formulated and tested for color consistency. More particularly, various polyoxymethylene polymer compositions were formulated, molded into test plaques, and tested for brightness differences (ΔL*) over the surface of the test plaque.

Each polymer composition contained a polyoxymethylene polymer combined with 2.5% by weight polytetrafluoroethylene particles. Each polymer composition also contained coloring agents or pigments that provided the polymer composition with a gray color. To the base formulation was added different color stabilizers. Specifically, the following color stabilizers were tested:

| Sample No. | Color Stabilizer |
|---|---|
| 1 | None |
| 2 | Oxidized polyethylene wax (1% by weight) |
| 3 | Ethylene bis-stearamide wax (melting point 142-145° C.) (1% by weight) |
| 4 | Ethylene bis-stearamide wax (vegetable based with melting point of 139-144° C.) (1% by weight) |
| 5 | Ethylene bis-stearamide wax (melting point 138-148° C.) (1% by weight) |
| 6 | Low molecular weight polyethylene wax (MW of 4,000 g/mol and density of 980 kg/m³) (1% by weight) |

The components of each respective composition were mixed together and compounded using a ZSK 25MC (Werner & Pfleiderer, Germany) twin screw extruder. The screw configuration with kneading elements was chosen so that effective thorough mixing of the components took place. The compositions were extruded and pelletized. The pellets were dried for 8 hours at 120° C. and then injection molded.

The above polymer compositions were injection molded at different temperatures to form tensile bars in accordance with ISO Test 527-1. Brightness measurements were then taken of the molded specimens at a location adjacent to the injection molding gate and at a location opposite the gate.

The following results were obtained:

| Sample No. | ΔL* | | |
|---|---|---|---|
| | $T_m = 185°$ C. | $T_m = 205°$ C. | $T_m = 215°$ C. |
| 1 (ref.) | 0.55 | 0.51 | 0.59 |
| 2 (ref.) | 0.53 | 0.55 | 0.52 |
| 3 | 0.2 | 0.22 | 0.2 |
| 4 | 0.19 | 0.19 | 0.23 |
| 5 | 0.16 | 0.19 | 0.26 |
| 6 | 0.19 | 0.2 | 0.29 |

As shown above, the use of a color stabilizer in accordance with the present disclosure can dramatically improve color consistency of the test specimens.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A conveyor device comprising:
a conveyor chain that moves over a track, the conveyor chain including a plurality of conveyor components having a top surface for receiving and transporting products, the conveyor components being comprised of a polymer composition containing a polyoxymethylene polymer, a first tribological modifier, a coloring agent, and a color stabilizer comprising a non-oxidized polymer wax compounded with the coloring agent, the color stabilizer comprising a polyethylene polymer having a molecular weight of less than about 10,000 g/mol or comprising an ethylene bis-stearamide, the one or more coloring agents being present in the polymer composition in an amount from about 0.1% by weight to about 2% by weight, and wherein the color stabilizer is present in the polymer composition in an amount from about 0.5% by weight to about 2% by weight, and wherein the polymer composition does not contain a silicone, and wherein the polymer composition has a dynamic coefficient of friction against a countermaterial of less than about 0.2, the countermaterial comprising aluminum, and wherein the composition exhibits a wear track depth of less than 2 microns when tested against aluminum.

2. A conveyor device as defined in claim 1, wherein a difference in surface brightness over a surface of the conveyor chain varies by no more than 0.5.

3. A conveyor device as defined in claim 1, wherein a difference in surface brightness over a surface of the conveyor chain varies by no more than 0.3.

4. A conveyor device as defined in claim 1, wherein a difference in surface brightness over a surface of the conveyor chain varies by no more than 0.25.

5. A conveyor device as defined in claim 1, wherein the color stabilizer comprises the polyethylene polymer.

6. A conveyor device as defined in claim 5, wherein the polyethylene polymer has a density of from about 0.92 g/cm³ to about 0.94 g/cm³.

7. A conveyor device as defined in claim 1, wherein the color stabilizer comprises the ethylene bis-stearamide.

8. A conveyor device as defined in claim 1, wherein the tribological modifier comprises a high density polyethylene.

9. A conveyor device as defined in claim 1, wherein the polymer composition has a dynamic coefficient of friction against a countermaterial of less than about 0.18, the countermaterial comprising aluminum.

10. A conveyor device as defined in claim 1, wherein the polymer composition further contains a copolyamide.

11. A conveyor device as defined in claim 1, wherein the polymer composition further contains an acid scavenger.

12. A conveyor device as defined in claim 11, wherein the acid scavenger comprises tricalcium citrate.

13. A conveyor device as defined in claim 1, wherein the polymer composition further contains a nucleant, wherein the nucleant comprises a polyoxymethylene terpolymer.

14. A conveyor device as defined in claim 13, wherein the one or more coloring agents comprises titanium dioxide, carbon black, a pigment, or mixtures thereof.

15. A conveyor device as defined in claim 1, wherein the polyoxymethylene polymer is present in the composition in an amount of at least 85% by weight.

\* \* \* \* \*